United States Patent
Hao et al.

[11] Patent Number: 6,013,776
[45] Date of Patent: Jan. 11, 2000

[54] FLUORESCENT AZO PIGMENTS

[75] Inventors: Zhimin Hao, Marly; John S. Zambounis, Murten; Abul Iqbal, Arconciel, all of Switzerland

[73] Assignee: Ciba Specialty Chemicals Corporation, Tarrytown, N.Y.

[21] Appl. No.: 09/089,140

[22] Filed: Jun. 2, 1998

Related U.S. Application Data

[62] Division of application No. 08/677,486, Jul. 9, 1996, Pat. No. 5,780,672, which is a division of application No. 08/319,399, Oct. 6, 1994, Pat. No. 5,561,232.

[51] Int. Cl.⁷ .......................... C09B 29/033; C09B 29/33
[52] U.S. Cl. ............................. 534/732; 534/733
[58] Field of Search ...................... 534/732, 733

[56] References Cited

U.S. PATENT DOCUMENTS

| | | | |
|---|---|---|---|
| 1,024,794 | 4/1912 | Levinstein et al. | 534/732 |
| 1,731,643 | 10/1929 | Wagner et al. | 534/732 |
| 1,735,960 | 11/1929 | Dreyfus | 534/732 X |
| 1,758,383 | 5/1930 | Wagner et al. | 534/732 |
| 2,040,473 | 5/1936 | Etzelmiller | 534/732 |
| 2,447,163 | 8/1948 | Conzetti | 534/732 |
| 2,813,855 | 11/1957 | Bossard et al. | 534/732 |
| 2,831,850 | 4/1958 | Merian et al. | 534/732 X |
| 3,136,752 | 6/1964 | Jung et al. | 534/733 X |
| 3,451,991 | 6/1969 | Kleiner | 534/732 |
| 3,455,970 | 7/1969 | Richenbacher et al. | 260/377 |
| 3,718,669 | 2/1973 | Gerson | 260/367 |
| 3,723,479 | 3/1973 | Schumacher | 260/368 |
| 3,839,316 | 10/1974 | Benz et al. | 260/162 |
| 3,980,634 | 9/1976 | Weaver | 534/733 X |
| 4,080,322 | 3/1978 | Mislin et al. | 260/194 |
| 4,119,621 | 10/1978 | Hansen et al. | 534/733 |
| 4,542,213 | 9/1985 | McClelland et al. | 544/76 |
| 4,585,878 | 4/1986 | Jost et al. | 548/453 |
| 4,791,204 | 12/1988 | Jost et al. | 548/101 |
| 4,826,976 | 5/1989 | Borror et al. | 544/58.4 |
| 5,116,958 | 5/1992 | Liechi et al. | 534/591 |
| 5,137,576 | 8/1992 | Macholdt et al. | 106/495 |
| 5,183,881 | 2/1993 | Jager | 534/733 X |
| 5,238,984 | 8/1993 | Wallquist et al. | 524/218 |
| 5,243,052 | 9/1993 | Taylor et al. | 546/154 |
| 5,527,889 | 6/1996 | Schaetzer et al. | 534/732 X |
| 5,561,232 | 10/1996 | Hao et al | 546/14 |

FOREIGN PATENT DOCUMENTS

| | | |
|---|---|---|
| 423068 | 10/1989 | European Pat. Off. . |
| 1944276 | 3/1971 | Germany . |
| 2250106 | 4/1973 | Germany . |
| 2250107 | 4/1973 | Germany . |
| 400289 | 12/1970 | Japan . |
| 4-124175 | 4/1992 | Japan . |
| 4123175 | 4/1992 | Japan . |
| 4053313 | 12/1993 | Japan . |
| 7-25169 | 1/1995 | Japan . |
| 231555 | 3/1925 | United Kingdom . |
| 510901 | 8/1939 | United Kingdom . |
| 905383 | 9/1962 | United Kingdom ................... 534/732 |
| 1185030 | 3/1970 | United Kingdom . |

OTHER PUBLICATIONS

Yoshiwara et al., Chemical Abstracts, 57:6071i, 1962.
Derwent Abstract of JP 07–025,169, 1995.
Zhimin et al., (CAS Online Print out, CA 123:146700, AN 1995:761564, RN 167020–28–2, EP 648817).
Baker et al. (CAS online Printout, AN 72:112699, RN 25389–32–6, GB 1185030).
Takahashi et al., (CAS Online Print out, CA 125:181169, AN 1996:527278., RN 167020–28–2,.EP 718697).
Schaedeli et al, (CAS Online Print out, CA 123:183553, An 1995:787206, RN 167020–28–2, EP 654,711).

(List continued on next page.)

*Primary Examiner*—Fiona T. Powers
*Attorney, Agent, or Firm*—Kevin T. Mansfield; David R. Crichton

[57] ABSTRACT

Compounds of formula $$A(B)_x, \quad (I),$$

wherein x is an integer from 1 to 4,

A is the radical of a chromophore of the quinacridone, anthraquinone, perylene, indigo, quinophthalone, isoindolinone, isoindoline, dioxazine, phthalocyanine or azo series, which radical contains x N-atoms attached to B, preferably with at least one directly adjacent or conjugated carbonyl group, B is a group of formula

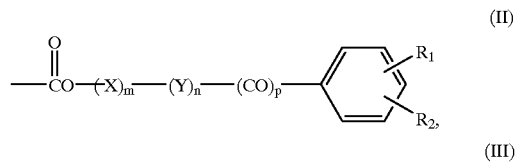

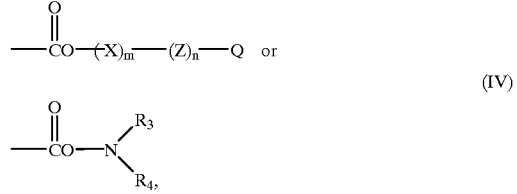

and, if x is 2, 3 or 4, may also be one, two or three hydrogen atoms.

The symbols Q, $R_1$, $R_2$, $R_3$, $R_4$, X, Y, Z, m and n, are as defined in claim 1.

These carbamate group-containing soluble chromophores are distinguished by outstanding solid state fluorescence in the UV range as well as the by ease with which they can be converted to the corresponding pigments in the substrate in which they are incorporated.

10 Claims, No Drawings

OTHER PUBLICATIONS

Herbst et al, Industrial Organic Pigments, pp. 494–500, 1993.

Derwent Abstract 85–253309/41, 1985.

Chigr et al, Tetrahedron Letters, vol. 28, No. 39, pp. 4529–4532 (1987).

Ullmann's Encylclopedia of Industrial Chemistry, Fifth Completely Revised Ed.,vol. A2, p. 389.

Alewood et al., J.C.S., Perkin I, "Acyl Nitroxides, Part 1, Synthesis and Isolation," pp. 1066–1076, (1978).

Harris et al., Tetrahedron Letters, vol. 24, No. 3, pp. 231–232, (1983).

Herbst et al., Industrial Organic Pigments, Production, Properties. Applications, 494–500, 1993.

D. Stevenson & G.T. Young, J. Chem. Soc [c], 1969,2389.

Herbst et al, Industrial Organic Pigments, pp. 514–518, 1993.

Roberts et al., Modern Organic Chemistry, 1967, Chapter 28, pp. 682–687.

Derwent Abstract 85–253309/41, 1985.

Ullmann's Encylclopedia of Industrial Chemistry, Fifth Completely Revised Ed., vol. A20, pp. 407–408.

FLUORESCENT AZO PIGMENTS

This application is a Divisional of application Ser. No. 08/677,486, filed Jul. 9, 1996, now U.S. Pat. No. 5,780,672, which is a Divisional of application Ser. No. 08/319,399, filed Oct. 6, 1994, now U.S. Pat. No. 5,561,232.

The present invention relates to novel soluble chromophores containing carbamate groups, to their preparation and to the use thereof as fluorescent pigments and as pigment precursors which can be readily converted into the corresponding pigments.

N-substituted pyrrolo[3,4-c]pyrroles are disclosed in U.S. Pat. Nos. 4,585,878 and 4,791,204. From the generic definition of all substituents it can be inferred that the N-substituents may also be, inter alia, alkoxycarbonyl groups, which are defined in U.S. Pat. No. 4,791,204 as including methoxycarbonyl, ethoxycarbonyl, n-propoxycarbonyl, n-butoxycarbonyl and n-hexyloxycarbonyl. U.S. Pat. No. 4,585,878 teaches that the N-substituted pyrrolo[3,4-c]-pyrroles disclosed therein exhibit high fluorescence in dissolved form in polymers.

The invention provides a novel carbamate group-containing soluble chromophores which, surprisingly, exhibit a very high solid state fluoroescence, especially in the UV range, and which are readily convertible into the corresponding pigments with simultaneous displacement of the absorption spectrum, and hence open the way to unexpected applications.

Accordingly, the invention relates to compounds of formula $$A(B)_x, \quad (I)$$

wherein x is an integer from 1 to 4,

A is the radical of a chromophore of the quinacridone, anthraquinone, perylene, indigo, quinophthalone, isoindolinone, isoindoline, dioxazine, phthalocyanine or azo series, which radical contains x N-atoms attached to B, preferably with at least one directly adjacent or conjugated carbonyl group, B is a group of formula $$-\overset{O}{\underset{\|}{C}}O-(X)_m-(Y)_n-(CO)_p-\underset{R_2}{\overset{R_1}{\text{Ar}}} \quad (II)$$

$$-\overset{O}{\underset{\|}{C}}O-(X)_m-(Z)_n-Q \text{ or} \quad (III)$$

$$-\overset{O}{\underset{\|}{C}}O-N\underset{R_4,}{\overset{R_3}{\diagup}} \quad (IV)$$

and, if x is 2, 3 or 4, may also be one, two or three hydrogen atoms, in which formulae (II), (III) and (IV)

m, n and p are each independently of one another 0 or 1,
X is $C_1$-$C_{14}$alkylene or $C_2$-$C_8$alkenylene,
Y is a group —V—$(CH_2)_q$—,
Z is a group —V—$(CH_2)_r$—,
V is $C_3$-$C_6$cycloalkylene,
q is an integer from 1 to 6 and
r is an integer from 0 to 6, $R_1$ and $R_2$ are each independently of the other hydrogen, $C_1$-$C_6$alkyl, $C_1$-$C_4$alkoxy, halogen, CN, $NO_2$, unsubstituted phenyl or phenoxy or phenyl or phenoxy which are substituted by $C_1$-$C_4$alkyl, $C_1$-$C_4$alkoxy or halogen, Q is hydrogen, CN, $Si(R_1)_3$, is a group $C(R_5)(R_6)(R_7)$, wherein $R_5$, $R_6$ and $R_7$ are each independently of one another hydrogen or halogen and at least one of $R_5$, $R_6$ and $R_7$ is halogen, a group $SO_2\text{—}\underset{R_2,}{\overset{R_1}{\text{Ar}}}$ wherein $R_1$ and $R_2$ are as defined above, a group $SO_2R_8$ or $SR_8$, wherein $R_8$ is $C_1$-$C_4$alkyl, is a group $CH(R_9)_2$, wherein $R_9$ is unsubstituted phenyl or phenyl which is substituted by $C_1$-$C_4$alkyl, $C_1$-$C_4$alkoxy or halogen, or is a group of formula

[pyridyl, pyrimidinyl, thienyl, furyl structures]

[(CH_3)_3C-substituted thioxanthene-CH, fluorene-CH, naphthyl structures, or methylphenanthrenyl]

$R_3$ and $R_4$ are each independently of the other hydrogen, $C_1$-$C_{18}$alkyl, a group $$-(X)_m-(Y)_n-\underset{R_2,}{\overset{R_1}{\text{Ar}}}$$

wherein X, Y, $R_1$, $R_2$, m and n are as defined above, or $R_3$ and $R_4$, together with the linking nitrogen atom, form a pyrrolidinyl, piperidinyl or morpholinyl radical.

A is the radical of a known chromophore having the basic structure $$A(H)_x,$$

for example

3
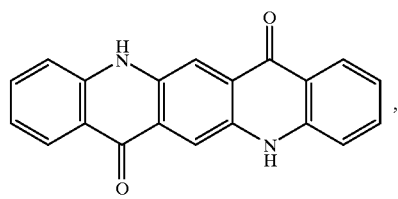
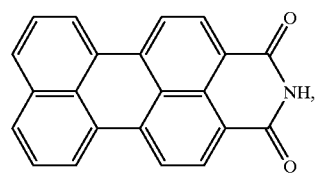
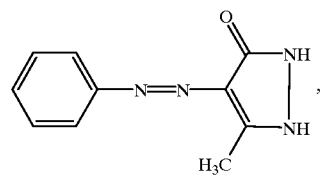
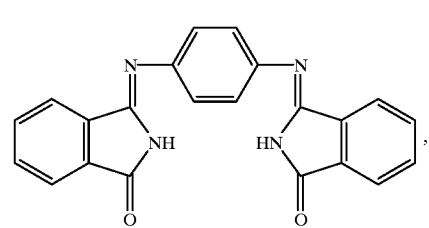
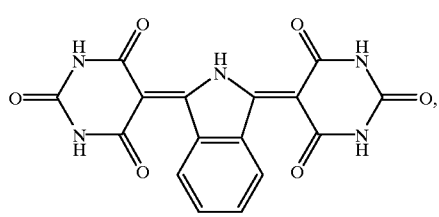
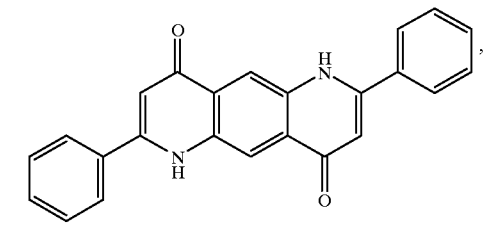
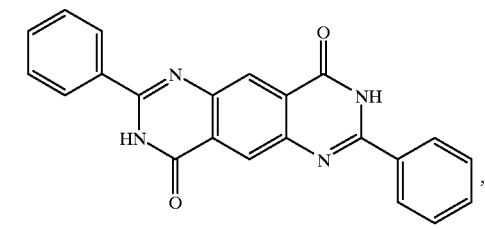
4
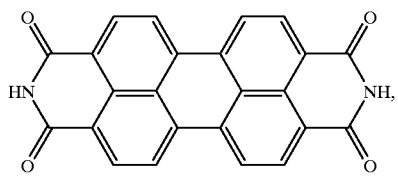
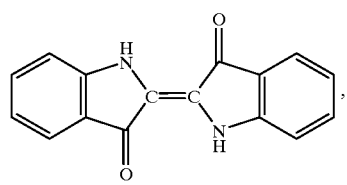
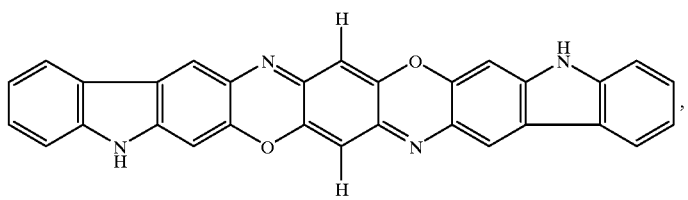
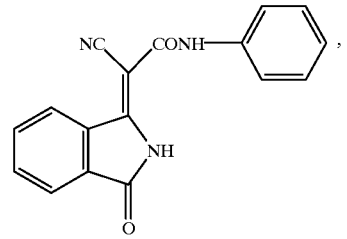
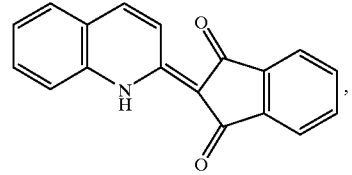
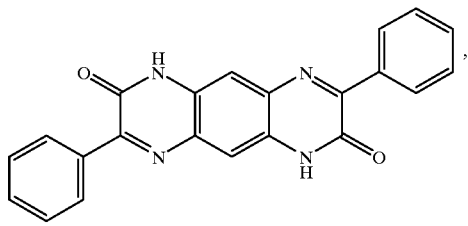
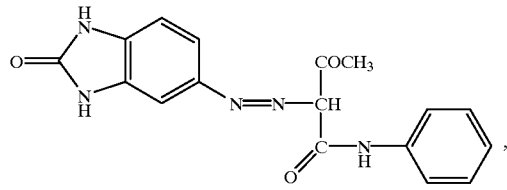

-continued

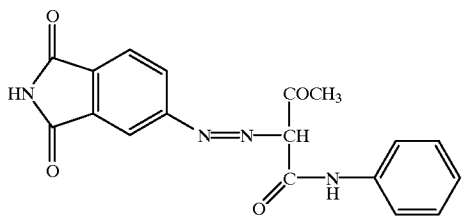

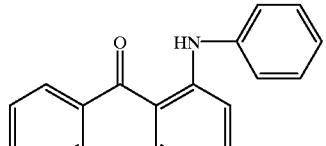

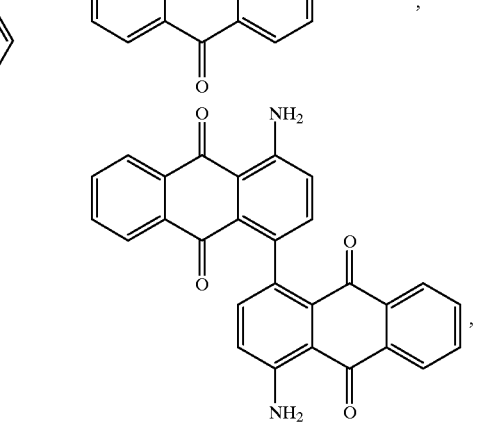

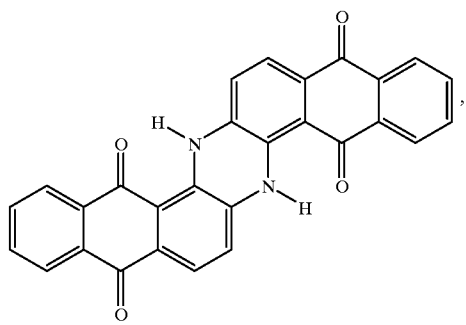

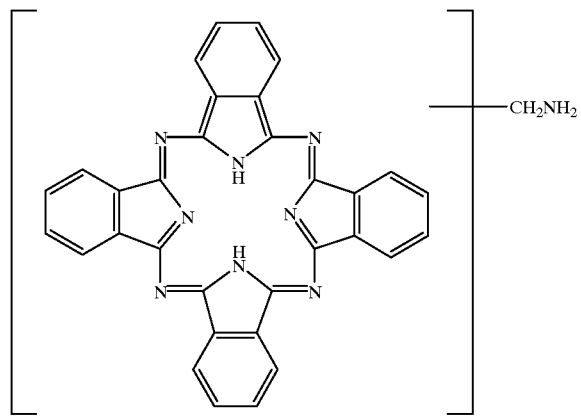

and all known derivatives thereof.

X in the significance of $C_1$–$C_{14}$alkylene is straight-chain or branched alkylene, typically methylene, dimethylene, trimethylene, 1-methylmethylene, 1,1-dimethylmethylene, 1,1-dimethyldimethylene, 1,1-dimethyltrimethylene, 1-ethyldimethylene, 1-ethyl-1-methyldimethylene, tetramethylene, 1,1-dimethyltetramethylene, 2,2-dimethyltrimethylene, hexamethylene, decamethylene, 1,1-dimethyldecamethylene, 1,1-diethyldecamethylene or tetradecamethylene.

X in the significance of $C_2$–$C_8$alkenylene is straight-chain or branched alkenylene, typically vinylene, allylene, methallylene, 1-methyl-2-butenylene, 1,1-dimethyl-3-butenylene, 2-butenylene, 2-hexenylene, 3-hexenylene or 2-octenylene.

Halogen substituents may be iodo, fluoro, preferably bromo and, most preferably, chloro.

$C_1$–$C_6$Alkyl will typically be methyl, ethyl, n-propyl, isopropyl, n-butyl, sec-butyl, tert-butyl, n-amyl, tert-amyl, hexyl, and $C_1$–$C_{18}$alkyl may additionally be heptyl, octyl, 2-ethylhexyl, nonyl, decyl, dodecyl, tetradecyl, hexadecyl or octadecyl.

$C_1$–$C_4$Alkoxy is typically methoxy, ethoxy, n-propoxy, isopropoxy or butoxy.

$C_3$–$C_6$Cycloalkylene is typically cyclopropylene, cyclopentylene and, preferably, cyclohexylene.

Particularly interesting compounds of formula I are those wherein x is 1 or 2 and B is a group of formula

  (IV)

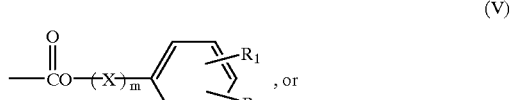  (V)

  (VI)

or and, if x is 2, may also be one hydrogen atom, and in formulae IV, V and VI m is 0 or 1, X is $C_1$–$C_4$alkylene or $C_2$–$C_5$alkenylene, $R_1$ and $R_2$ are each independently of the other hydrogen, $C_1$–$C_4$alkyl, methoxy, chloro or $NO_2$, and Q is hydrogen, CN, CCl₃, a group

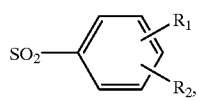

SO$_2$CH$_3$ or SCH$_3$, R$_3$ and R$_4$ are each independently of the other hydrogen, C$_1$–C$_4$alkyl or a group

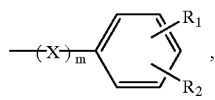, or R$_3$ and R$_4$, taken together, form a piperidinyl radical, and preferably those wherein x is 2 and B may be twice a group of formula

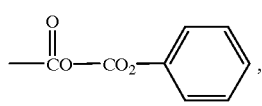,

,

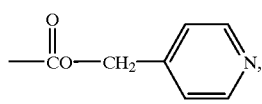,

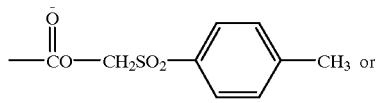 or

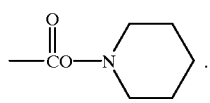.

Preferred compounds of formula I are a) perylenecarboximides of formula

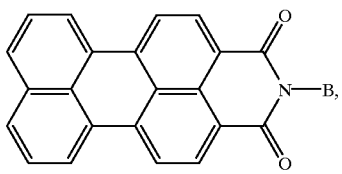

(VIIb)

wherein D is hydrogen, C$_1$–C$_6$alkyl, unsubstituted or halogen- or C$_1$–C$_4$alkyl-substituted phenyl, benzyl or phenethyl, or is B, b) quinacridones of formula

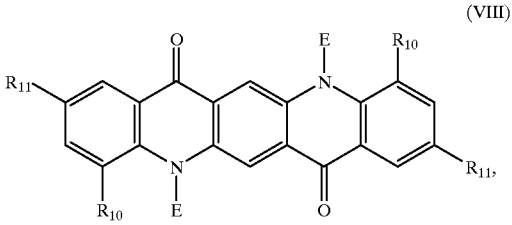

(VIII)

wherein R$_{10}$ and R$_{11}$ are each independently of the other hydrogen, halogen, C$_1$–C$_{18}$alkyl, C$_1$–C$_4$alkoxy or phenyl, c) dioxazines of formula

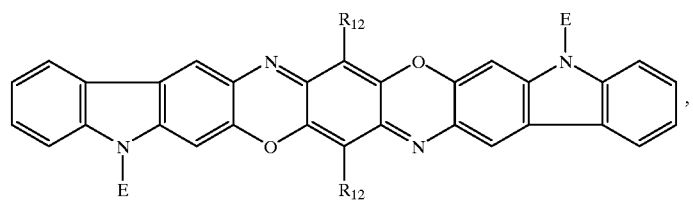

(IX)

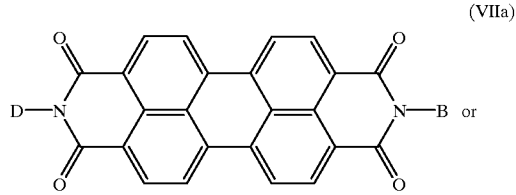

(VIIa)

wherein R$_{12}$ is hydrogen, halogen or C$_1$–C$_{18}$alkyl, d) isoindolines of formulae

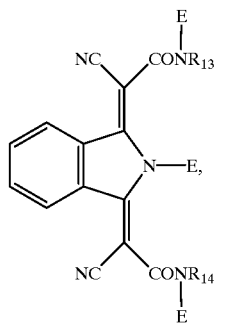
(X)

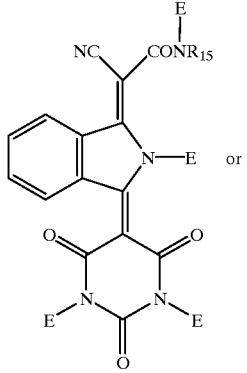
(XI) or

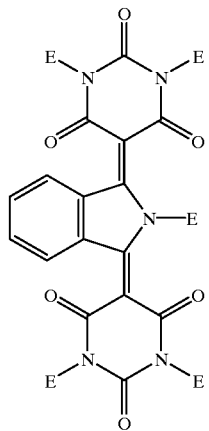
(XII)

wherein $R_{13}$ is a group

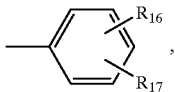, $R_{14}$ is hydrogen, $C_1$–$C_{18}$alkyl, benzyl or a group

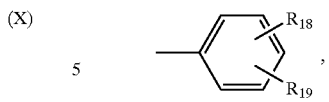, $R_{15}$ has the same meaning as $R_{13}$,
$R_{16}$, $R_{17}$, $R_{18}$ and $R_{19}$ are each independently of one another hydrogen, $C_1$–$C_{18}$alkyl, $C_1$–$C_4$alkoxy, halogen or trifluoromethyl, e) indigo derivatives of formula

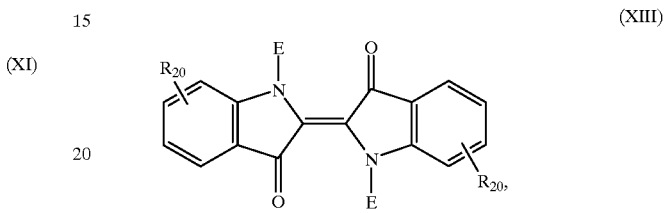
(XIII)

wherein $R_{20}$ is hydrogen, CN, $C_1$–$C_4$alkyl, $C_1$–$C_4$alkoxy or halogen, f) azo compounds of formula

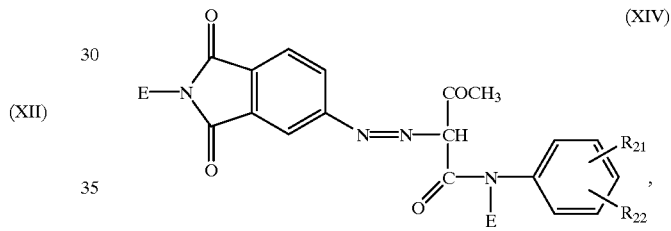
(XIV)

wherein $R_{21}$ and $R_{22}$ are each independently of the other hydrogen, halogen, $C_1$–$C_4$alkyl or $C_1$–$C_4$alkoxy, g) anthraquinoid compounds of formula

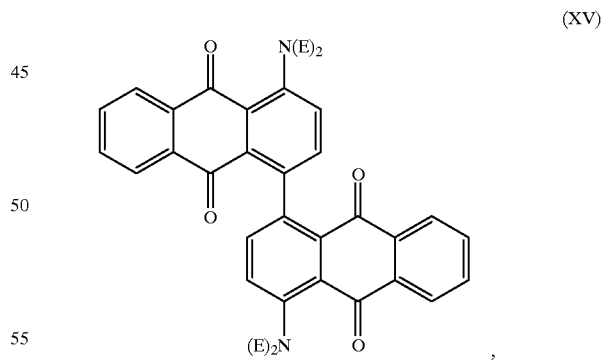
(XV)

and h) phthalocyanines of formula

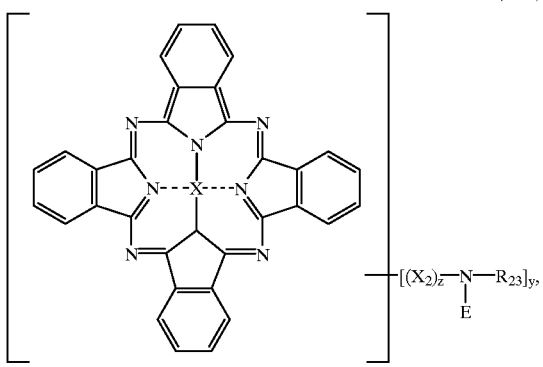

(XVI)

wherein
$X_1$ is $H_2$, Zn, Cu, Ni, Fe or V,
$X_2$ is —CH($R_{24}$)— or —$SO_2$—
$R_{23}$ is hydrogen, $C_1$–$C_4$alkyl, —N(E)$R_{24}$, —NHCO$R_{25}$, —CO$R_{25}$ or

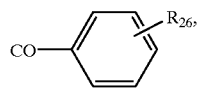

$R_{24}$ is hydrogen or $C_1$–$C_4$alkyl, $R_{25}$ is $C_1$–$C_4$alkyl and $R_{26}$ is hydrogen, halogen, $C_1$–$C_4$alkyl or $C_1$–$C_4$alkoxy,
z is 0 or 1 and y is an integer from 1 to 4, in each of which formulae E is hydrogen or is B, with the proviso that E in each formula is at least one group B and B is as defined above, in respect of which definition the preferred meanings cited above apply.

Among the phthalocyanines, those of formula XVI, wherein $X_1$ is $H_2$, Cu or Zn, $X_2$ is —$CH_2$— or —$SO_2$—, $R_{23}$ is hydrogen, —NHCOCH$_3$ or benzoyl and z is 1, are preferred.

In U.S. Pat. No. 4,585,878 it is said in connection with the preparation of N-unsubstituted pyrrolpyrroles that they can be obtained by reacting a N-substituted pyrrolo-3,4-c-pyrrole with a compound that carries the corresponding N-substituents as leaving groups in an organic solvent. In the sole Example describing a compound containing a N-carbonyl group (Example 9: N-benzoyl), 1,4-diketo-3,6-diphenyl-pyrrolo[3,4-c]pyrrole is reacted with benzoyl chloride. In the experiment to prepare the desired carbamates in analogous manner by reaction with a corresponding acid chloride derivative, it was unfortunately found that it was only possible to obtain said carbamates in poor yield.

Very surprisingly, however, it was observed that when using appropriate trihaloacetates, azides, carbonates, alkylidene-iminooxyformates or, in particular, appropriate dicarbonates, the desired carbamates are obtained in very good yield. An improved yield is also obtained—even if only to a lesser degree—by carrying out the reaction with an aliphatic acid chloride derivative, conveniently butyl chloroformate, in the presence of a base as catalyst.

Accordingly, the invention further relates to a process for the preparation of compounds of formula I, which comprises reacting a compounds of formula A(H)$_x$, (XVII)

wherein A and x are as defined above, in the desired molar ratio with a dicarbonate of formula

B—O—B (XVIII)

or with a trihaloacetate of formula $(R_{27})_3$C—B (XIX), or with an azide of formula

BN$_3$ (XX), or with a carbonate of formula

B—OR$_{28}$ (XXI), or with an alkylidene-iminooxyformate of formula (XXII)

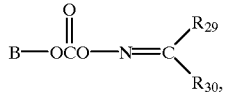

wherein B is as defined above, $R_{27}$ is chloro, fluoro or bromo, $R_{28}$ is $C_1$–$C_4$alkyl or unsubstituted phenyl or phenyl which is substituted by halogen, $C_1$–$C_4$alkyl, $C_1$–$C_4$alkoxy or —CN, $R_{29}$ is —CN or —COO$R_{18}$, and $R_{30}$ is unsubstituted phenyl or phenyl which is substituted by halogen, $C_1$–$C_4$alkyl, $C_1$–$C_4$alkoxy or —CN, in an aprotic organic solvent and in the presence of a base as catalyst, conveniently in the temperature range from 0 to 400° C., preferably from 10 to 200° C., for 2 to 80 hours.

It is preferred to react the compound of formula XVII with a dicarbonate of formula XVIII.

The compounds of formula XVII, dicarbonates of formula XVIII, trihaloactetates of formula XIX, azides of formula XX, carbonates of formula XXI and alkylidene-iminooxyformates of formula XXII are known substances. Any that are novel can be prepared by methods analogous to standard known ones.

The respective molar ratio of the compounds of formula XVII and the compounds of formulae XVIII–XXII will depend on the meaning of x, i.e. on the number of groups B to be introduced. Preferably, however, the compounds of formulae XVIII–XXII will be used in a 2- to 10-fold excess.

Suitable solvents are typically ethers such as tetrahydrofuran or dioxane, or glycol ethers such as ethylene glycol methyl ether, ethylene glycol ethyl ether, diethylene glycol monomethyl ether or diethylene glycol monoethyl ether, and also dipolar aprotic solvents such as acetonitrile, benzonitrile, N,N-dimethylformamide, N,N-dimethylacetamide, nitrobenzene, N-methylpyrrolidone, halogenated aliphatic or aromatic hydrocarbons such as trichloroethane, benzene or alkyl- alkoxy- or halogen-substituted benzene, typically including toluene, xylene, anisole or chlorobenzene, or aromatic N-heterocycles such as pyridine, picoline or quinoline. Preferred solvents are typically tetrahydrofuran, N,N-dimethylformamide and N-methylpyrrolidone. The cited solvents may also be used as mixtures. It is convenient to use 5–20 parts by weight of solvent to 1 part by weight of reactant.

Bases suitable as catalysts are typically the alkali metals themselves, conveniently lithium, sodium or potassium and the hydroxides or carbonates thereof, or alkali metal amides such as lithium, sodium or potassium amide or alkali metal hydrides such as lithium, sodium or potassium hydride, or alkaline earth metal or alkali metal alcoholates which are derived in particular from primary, secondary or tertiary aliphatic alcohols of 1 to 10 carbon atoms, for example lithium, sodium or potassium methylate, ethylate, n-propylate, isopropylate, n-butylate, sec-butylate, tert-butylate, 2-methyl-2-butylate, 2-methyl-2-pentylate, 3-methyl-3-pentylate, 3-ethyl-3-pentylate, and also organic aliphatic aromatic or heterocyclic N-bases, typically including diazabicyclooctene, diazabicycloundecene and 4-dimethylaminopyridine and trialkylamines such as trimethylamine or triethylamine. A mixture of the cited bases may also be used.

The organic nitrogen bases are preferred, for example diazabicyclooctene, diazabicycloundecene and preferably, 4-dimethylaminopyridine.

The reaction is preferably carried out in the temperature range from 10 to 100° C., most preferably from 14 to 40° C., and under atmospheric pressure.

The novel compounds of formula I are admirably suitable for use as fluorescent pigments for the mass colouration of organic material of high molecular weight.

Illustrative examples of high molecular weight organic materials which can be coloured with the novel compounds of formula I are vinyl polymers such as polystyrene, poly-α-methylstyrene, poly-p-methylstyrene, poly-p-hydroxystyrene, poly-p-hydroxyphenylstyrene, poly (methylacrylate) and poly(acrylamide) as well as the corresponding methacrylic compounds, poly (methylmaleate), poly(acrylonitrile), poly (methacrylonitrile), poly(vinyl chloride), poly(vinyl fluoride), poly(vinylidene chloride), poly(vinylidene fluoride), poly(vinyl acetate), poly(methyl vinyl ether) and poly(butyl vinyl ether); novolaks derived from $C_1$–$C_6$ aldehydes, typically formaldehyde and acetaldehyde, and a binuclear, preferably mononuclear, phenol which may be substituted by one or two $C_1$–$C_9$ alkyl groups, one or two halogen atoms or a phenyl ring, for example o-, m- or p-cresol, xylene, p-tert-butyl phenol, o-, m- or p-nonylphenol, p-chlorophenol or p-phenylphenol, or from a compound containing more than one phenolic group, e.g. resorcinol, bis(4-hydroxyphenyl)methane or 2,2-bis(4-hydroxyphenyl)propane; polymers derived from maleimide and/or maleic anhydride, e.g. copolymers of maleic anhydride and styrene; poly(vinylpyrrolidone), biopolymers and derivatives thereof such as cellulose, starch, chitine, chitosane, gelatin, zein, ethyl cellulose, nitrocellulose, cellulose acetate and cellulose butyrate; natural resins and synthetic resins such as rubber, casein, silicone and silicone resins, ABS, urea/formaldehyde and melamine/formaldehyde resins, alkyd resins, phenolic resins, polyamides, polyimides, polyamide/imides, polysulfones, polyether sulfones, polyphenylene oxides, polyurethanes, polyureas, polycarbonates, polyarylenes, polyarylene sulfides, polyepoxides, polyolefins and polyalkadienes. Preferred high molecular weight organic materials are typically cellulose ethers and esters, for example ethyl cellulose, nitrocellulose, cellulose acetate or cellulose butyrate, natural resins or synthetic resins such as polymerisation or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, ABS, polyphenylene oxide, rubber, casein, silicone and silicone resins, singly or in mixtures.

The above high molecular weight organic compounds may be singly or as mixtures in the form of plastic materials, melts or of spinning solutions, pain systems, coating materials or printing inks. Depending on the end use requirement, it is expedient to use the novel compounds of formula I as toners or in the form of preparations.

The novel compounds of formula I are particularly suitable for the mass coloration of polyesters, polyvinyl chloride and, preferably, polyolefins such as polyethylene and polypropylene, as well as paint systems, also powder coating compositions, printing inks and coating materials.

The novel compounds of formula I can be used in an amount of 0.01 to 30% by weight, preferably 0.1 to 10% by weight, based on the high molecular weight organic material to be pigmented.

The pigmenting of the high molecular weight organic materials with the novel compounds of formula I is conveniently effected by incorporating a compound of formula I by itself or in the form of a masterbatch in the substrates using roll mills, mixing or milling apparatus. The pigmented material is then brought into the desired final form by methods which are known per se, conveniently by calendering, moulding, extruding, coating, casting or by injection moulding. It is often desirable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated before or after blending the pigment salts of this invention into the polymers. To obtain different shades it is also possible to add filters or other chromophoric components such as white, coloured or black pigments in any amount to the high molecular weight organic materials in addition to the novel compounds of this invention.

For pigmenting paint systems, coating materials and printing inks, the high molecular weight organic materials and the novel compounds of formula I, together with optional additives such as filters, other pigments, siccatives or plasticisers, are finely dispersed or dissolved in a common organic solvent or mixture of solvents. The procedure may be such that the individual components by themselves, or also several components together, are dispersed or dissolved in the solvent and thereafter all the components are mixed.

When used for colouring, inter alia, polyvinyl chloride or polyolefins or printing inks, the novel compounds of formula I have good allround pigment properties, including good fastness to migration, light and weathering, and especially unexpectedly high fluorescence.

Of very great importance, however, is the entirely unexpected ease with which the soluble chromophores of this invention—even in the substrate in which they have already been incorporated—can be converted to the corresponding chromophore of formula $A(H)_x$. This can be done in the simplest manner, whether by thermal treatment (heating to the temperature range from 50 to 400° C., preferably from 100 to 200° C. or laser radiation), photolytic treatment (exposure to wavelengths below e.g. 375 nm) or chemical treatment (with organic or inorganic acids or bases) of the solid materials, solutions or dispersions containing the novel chromophores in organic or aqueous media, polymer solutions or melts. These conversion methods can also be combined, thereby permitting the coloration of paint systems, printing inks, especially for ink jet printing, and plastics, also in fibre form, with unexpectedly enhanced properties such as purity, colour strength, brilliance and transparency, as well as interesting applications in the analytical field.

It has even been found that the chemical treatment of specific chromophores of formula I with an organic or inorganic acid at 50 to 180° C., preferably from 80 to 160° C., and subsequent cooling to about 70 to 100° C., or the thermal treatment of said compounds by heating to the temperature range from 180–350° C., can result in crystal modifications of the corresponding chromophores of formula XVII.

The invention therefore additionally relates to a process for the crystal modification of chromophores of formula XVII, comprising a) the chemical treatment of a chromophore of formula I with an organic or inorganic acid at 50 to 180° C. and subsequent cooling, or b) the thermal treatment of a chromophore of formula I in the temperature range from 180 to 350° C.

The invention is illustrated in more detail by the following Examples.

EXAMPLE 1

To a mixture of 1.8 g (0.00576 mol) of quinacridone and 0.3 g (0.00246 mol) of 4-dimethylaminopyridine in 90 ml of N,N-dimethylformamide are added 6.0 g (0.0275 mol) of di-tert-butyldicarbonate. The resultant violet suspension is stirred overnight at room temperature, with the exclusion of atmospheric moisture. The colour changes to yellowish-orange. Afterwards, the reaction mixture is poured, with stirring, into 100 ml of distilled water. The yellow precipitate is isolated by filtration and the residue is washed with distilled water and dried, affording 2.8 g (95% of theory) of the product of formula

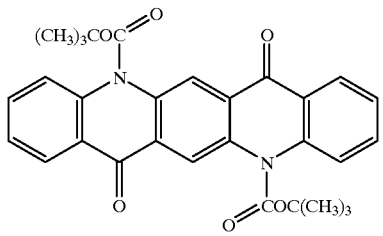

Analysis:

$^1$H-NMR (CDCl$_3$): 8.74 (s, 2 H); 8.41 (d, 2 H); 7.84 (d, 2 H); 7.72 (t, 2 H); 7.38 (t, 2 H); 1.75 (s, 18 H).

EXAMPLE 2

To a suspension of 10.31 g (0.0393 mol) of indigo and 2.79 g (0.0228 mol) of 4-dimethylaminopyridine in 150 ml of N,N-dimethylformamide are added, in two portions, 45.31 g (0.2076 mol) of di-tert-butyldicarbonate. The mixture is stirred for 20 hours at room temperature, during which time the colour changes from dark blue to violet. The product is isolated by filtration and the residue is washed first with 20 ml of dimethyl formamide, then with distilled water, and dried, affording 9.79 g of a brilliant red solid. An additional 5.13 g of product is obtained by diluting the filtrate with distilled water. The total yield is 14.93 g (82.1% of theory) of a product of formula

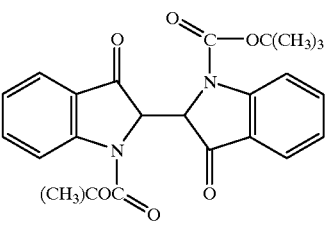

Analysis:

$^1$H-NMR (CDCl$_3$): 8.02 (d, 2 H); 7.76 (d, 2 H); 7.61 (t, 2 H); 7.21 (t, 2 H); 1.62 (s, 18 H).

EXAMPLE 3

To a mixture of 1.5 g (0.00337 mol) of the pigment of formula

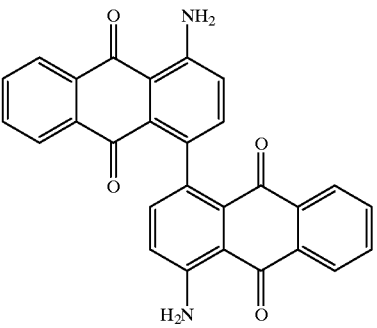

and 9.7 g (0.0444 mol) of di-tert-butyldicarbonate in 80 ml of N,N-dimethylacetamide is added 0.18 g (0.00147 mol) of 4-dimethylaminopyridine. The resultant suspension is stirred for 24 hours at room temperature. The reaction mixture is then poured, with stirring, into 200 ml of distilled water. The yellow precipitate is isolated by filtration and the residue is washed with distilled water and dried at room temperature under vacuum, affording 2.71 g (95% of theory) of a product of formula

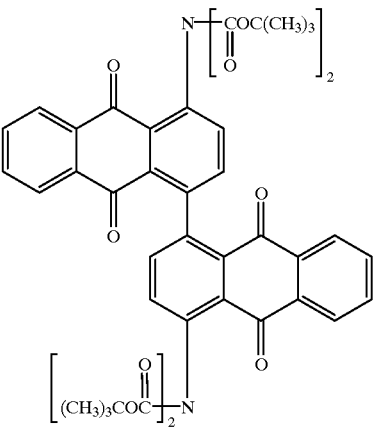

Analysis:

$^1$H-NMR (CDCl$_3$): 8.22 (d, 2 H); 7.83 (d, 2 H); 7.72 (t, 2 H); 7.63 (t, 2 H); 7.56 (d, 2 H); 7.42 (d, 2 H); 1.45 (s, 36 H).

EXAMPLE 4

To a mixture of 1.4 g (0.0037 mol) of a monoazopigment of formula

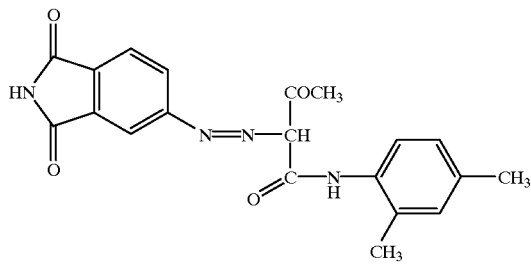

and 2.67 g (0.01221 mol) of di-tert-butyldicarbonate in 50 ml of N,N-dimethylacetamide are added 0.2 g (0.00164 mol) of 4-dimethylaminopyridine. The reaction mixture is stirred for 48 hours at room temperature, during which time an organic suspension forms. The yellow precipitate is then isolated by filtration and the residue is washed with a small amount of N,N-dimethylacetamide and afterwards with distilled water and dried at room temperature under vacuum, affording 0.67 g (31% of theory) of a product of formula

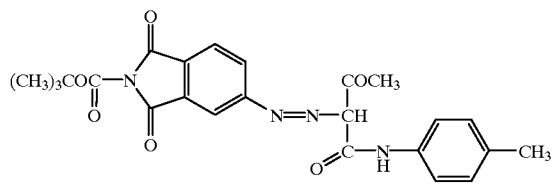

Analysis:

$^1$H-NMR (CDCl$_3$): 15.9 (s, br, 1 H); 11.17 (s, br, 1 H); 7.94 (d, 1 H); 7.90 (s, 1 H); 7.85 (d, 1 H); 7.64 (d, 1 H); 7.06-7.04 (m, 2 H); 2.65 (s, 3 H); 2.35 (s, 3 H); 2.32 (s, 3 H); 1.64 (s, 9 H).

EXAMPLE 5

0.07 g of the product of Example 1 are heated in a test tube for 10 minutes at 180° C. All analytical data obtained for the resultant violet powder are in accord with those of the pure quinacridone of formula

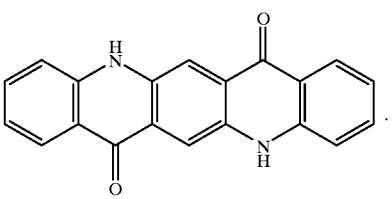

The conversion yield is 99%.

EXAMPLE 6

0.07 g of the product of Example 3 are dissolved in 1 ml of acetone and the solution is then added all at once to 1 ml of 33% HCl. All analytical data obtained for the resultant red powder are in accord with those of the pure pigment of formula

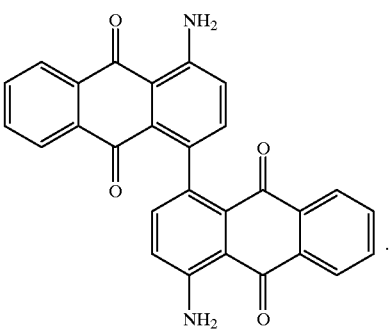

The conversion yield is 99%.

EXAMPLES 7–10

In accordance with the general procedure described in Example 1, the compounds of formula

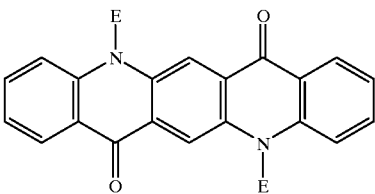

listed in the following Table can be obtained using corresponding dicarbonates.

| Example | E | Solvent | Reaction-time | Yield | Colour |
| --- | --- | --- | --- | --- | --- |
| 7 | —CO—O—C(CH$_3$)(CH$_2$CH$_3$)—CH$_3$ | DMF | 30 h | 80% | yellowish orange |
| 8 | —CO—O—C(CH$_2$CH$_3$)$_3$ | DMF | 24 h | 30% | yellowish orange |

-continued

| Example | E | Solvent | Reaction-time | Yield | Colour |
|---|---|---|---|---|---|
| 9 | —CO—C(CH₃)(CH₃)—CH₂—C₆H₅ (with C=O) | DMF | 16 h | 80% | yellowish orange |
| 10 | —CO—CH(CH₃)—CH₃ (with C=O) | DMF | 24 h | 35% | yellowish orange |

DMF = dimethyl formamide

EXAMPLE 11

To a suspension of 1.03 g of the product of Example 1 in 30 ml of N,N'-dimethylformamide and 10 ml of water are added 4 ml of trifluoroacetic acid. The mixture is heated to 105° C., stirred for 2 hours at this temperature and then chilled on an ice-bath to 20° C. The precipitated pigment is isolated by filtration, washed with methanol and then with water and dried at 60° C. under vacuum, affording 0.59 g of red powder. The X-ray diffraction pattern is characterised by the following diffraction lines:

| Interplanar spacing (d values in Å) | Two-fold hue angle (2 Θ) | Relative intensity |
|---|---|---|
| 15.0530 | 5.87 | 100 |
| 7.5164 | 11.76 | 45 |
| 5.5635 | 15.92 | 27 |
| 4.0350 | 22.01 | 21 |
| 3.7534 | 23.69 | 9 |
| 3.2870 | 27.11 | 61 |
| 2.9988 | 29.77 | 5 |
| 2.3129 | 38.91 | 5 |

(β-modification of quinacridone).

EXAMPLE 12

A mixture of 4.75 g of toluene-4-sulfonic acid and 100 ml of diphenyl ether is heated to 150° C. To the solution so obtained is then added a solution of 1.03 g of the product of Example 1 in 150 ml of tetrahydrofuran over 5 hours at 150° C. The tetrahydrofuran which evaporates rapidly under these reaction conditions is condensed in a Liebig condenser and collected in a receiver. The reaction mixture is stirred for a further 2 hours at 150° C. and then cooled to 60° C. The precipitated pigment is isolated by filtration, washed with methanol and afterwards with water and dried under vacuum at 60° C., affording 0.67 g of a red powder.

The X-ray diffraction pattern is characterised by the following diffraction lines:

| Interplanar spacing (d values in Å) | Two-fold hue angle (2 Θ) | Relative intensity |
|---|---|---|
| 13.6841 | 6.45 | 100 |
| 6.7972 | 13.01 | 43 |
| 6.6153 | 13.37 | 52 |
| 6.4440 | 13.73 | 84 |
| 5.5678 | 15.91 | 5 |
| 5.2536 | 16.86 | 10 |

-continued

| Interplanar spacing (d values in Å) | Two-fold hue angle (2 Θ) | Relative intensity |
|---|---|---|
| 4.3559 | 20.37 | 14 |
| 3.7526 | 23.69 | 14 |
| 3.5632 | 24.97 | 11 |
| 3.3796 | 26.35 | 66 |
| 3.3583 | 26.52 | 55 |
| 3.2065 | 27.80 | 7 |
| 3.1306 | 28.49 | 7 |
| 2.9534 | 30.24 | 6 |
| 2.4576 | 36.53 | 5 |
| 2.2135 | 40.73 | 7 |

(γ-modification of quinacridone).

What is claimed is:

1. A compound of formula $$A(B)_x, \qquad (I),$$

wherein x is an integer 1, 2 or 3,

A is the radical of a chromophore of the azo series, which radical contains x N atoms to which B groups are attached; at least one carbonyl group being adjacent at least one of said N atoms of said chromophore to which said B groups are attached, B is a group of formula

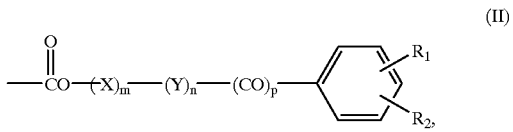

(II)

(III)

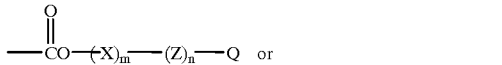

(IV)

or, when x is 2 or 3, B may also be hydrogen, with the proviso that at least one B is a group of formula (II) or (III) which is branched at the atom attached to said

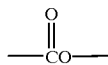

group, or a group of formula (IV);

m, n and p are each independently of one another zero or 1,

X is $C_2$–$C_{14}$alkylene or $C_2$–$C_8$alkenylene,

Y is a group of —V—$(CH_2)_q$—,

Z is a group —V—$(CH_2)_r$—,

V is $C_3$–$C_6$cycloalkylene, q is an integer from 1 to 6, and r is an integer from zero to 6, $R_1$ and $R_2$ are each independently of the other hydrogen, $C_1$–$C_6$alkyl, $C_1$–$C_4$alkoxy, halogen, CN, $NO_2$, unsubstituted phenyl or phenoxy or phenyl or phenoxy which are substituted by $C_1$–$C_4$alkyl, $C_1$–$C_4$alkoxy or halogen, Q is hydrogen, CN, $Si(R_1)_3$;

a group $C(R_5)(R_6)(R_7)$, wherein $R_5$, $R_6$ and $R_7$ are each independently of one another hydrogen or halogen and at least one of $R_5$, $R_6$ and $R_7$ is halogen;

a group

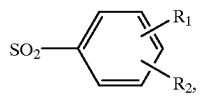

wherein $R_1$ and $R_2$ are as defined above;

a group $SO_2R_8$ or $SR_8$, wherein $R_8$ is $C_1$–$C_4$alkyl;

a group $CH(R_9)_2$, wherein $R_9$ is unsubstituted phenyl or phenyl which is substituted by $C_1$–$C_4$alkyl, $C_1$–$C_4$alkoxy or halogen; or a group of formula

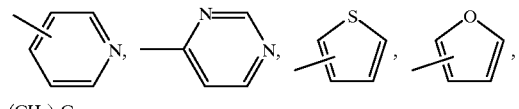

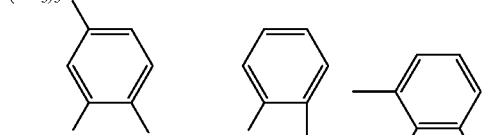

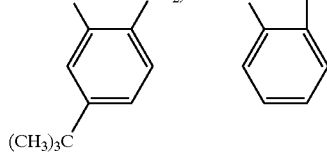

$R_3$ and $R_4$ are each independently of the other hydrogen, $C_1$–$C_{18}$alkyl, or a group

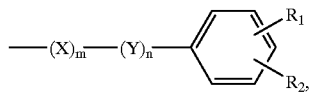

wherein X, Y, $R_1$, $R_2$, m and n are as defined above, or $R_3$ and $R_4$, together with the linking nitrogen atom, form a pyrrolidinyl, piperidinyl or morpholinyl radical.

2. A compound of formula (I) according to claim 1, wherein x is 1 or 2 and B is a group of formula (IV)

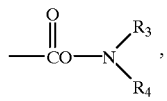

or a group of formula (V)

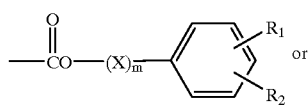

or (VI)

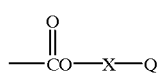

which is branched at the atom attached to said

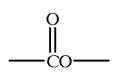

group and, if x is 2, may also be one hydrogen atom, and in formulae IV, V and VI m is 0 or 1, X is $C_2$–$C_{14}$alkylene or $C_2$–$C_5$alkylene, $R_1$ and $R_2$ are each independently of the other hydrogen $C_1$–$C_4$alkyl, methoxy, chloro or $NO_2$, and Q is hydrogen, CN, $CCl_3$, a group

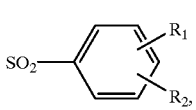

$SO_2CH_3$ or $SCH_3$, $R_3$ and $R_4$ are each independently of the other hydrogen, $C_1$–$C_4$alkyl or a group

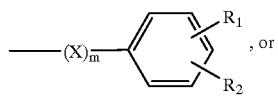

, or or $R_3$ and $R_4$, taken together, form a piperidinyl radical.

3. A compound of formula (I) according to claim 1, wherein x is 2, and B is a group of formula

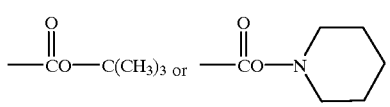

4. A compound of formula I according to claim 1, wherein A is the radical of a chromophore having

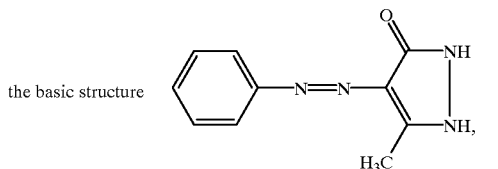

the basic structure

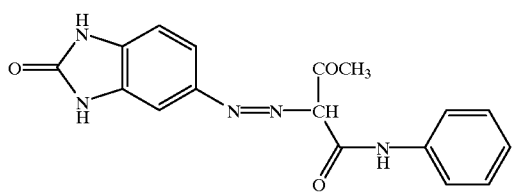

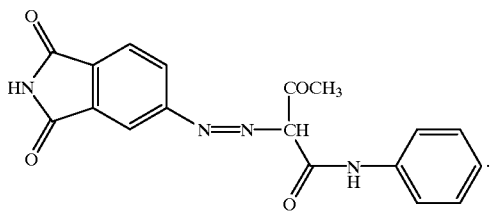

5. A compound of formula I according to claim 4, wherein A is the radical of a chromophore having the basic structure

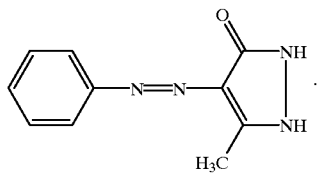

6. A compound of formula I according to claim 4, wherein A is the radical of a chromophore having the basic structure

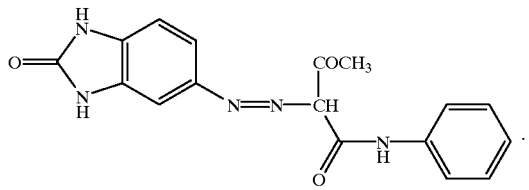

7. A compound of formula I according to claim 4, wherein A is the radical of a chromophore having the basic structure

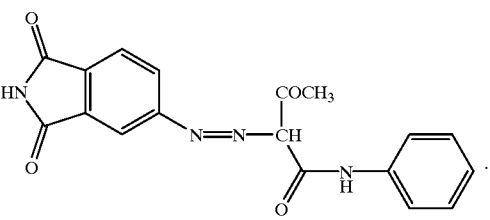

8. A compound of formula $$A'(B')_x \qquad \text{(XXIII)}$$

wherein x is an integer from 1 to 3,

A' is the radical of an arylazo-acetoacetamido-aryl chromophore of the series, which radical contains x N atoms to which B' groups are attached; at least one carbonyl group being adjacent to at least one of said N atoms of said chromophore to which said B' groups are attached, B' is a group of formula

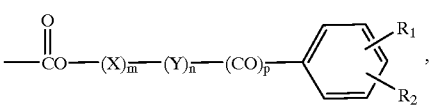  (II)

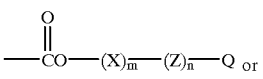  (III)

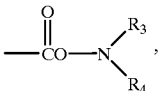  (IV)

or, when x is 2 or 3, B' may also be one or two hydrogens, with the proviso that at least one B' is a group of formula (II), (III) or (IV), m, n and p are each independently of one another zero or 1, X is $C_1$–$C_{14}$alkylene or $C_2$–$C_8$alkylene, Y is a group —V—$(CH_2)_q$—, Z is a group —V—$(CH_2)_r$—, V is $C_3$–$C_6$cycloalkylene, q is an integer from 1 to 6, and r is an integer from zero to 6, $R_1$ and $R_2$ are each independently of the other hydrogen, $C_1$–$C_6$alkyl, $C_1$–$C_4$alkoxy, halogen, CN, $NO_2$, unsubstituted phenyl or phenoxy or phenyl or phenoxy which are substituted by $C_1$–$C_4$alkyl, $C_1$–$C_4$alkoxy or halogen, Q is hydrogen, CN, $Si(R_1)_3$; a group $C(R_5)(R_6)(R_7)$, wherein $R_5$, $R_6$ and $R_7$ are each independently of one another hydrogen or halogen and at least one of $R_5$, $R_6$ and $R_7$ is halogen;

a group

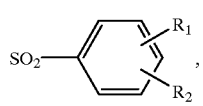

wherein $R_1$ and $R_2$ are as defined above;

a group $SO_2R_8$ or $SR_8$, wherein $R_8$ is $C_1$–$C_4$alkyl;

a group $CH(R_9)_2$, wherein $R_2$ is unsubstituted phenyl or phenyl which is substituted by $C_1$–$C_4$alkyl, $C_1$–$C_4$alkoxy or halogen; or a group of formula

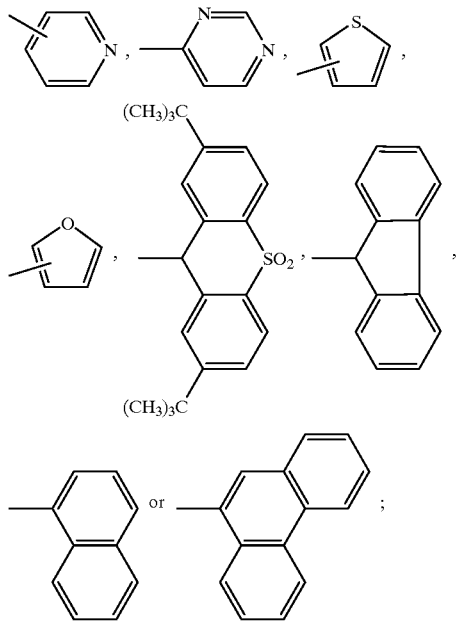

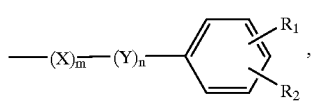

$R_3$ and $R_4$ are each independently of the other hydrogen, $C_1$–$C_{18}$alkyl, or a group

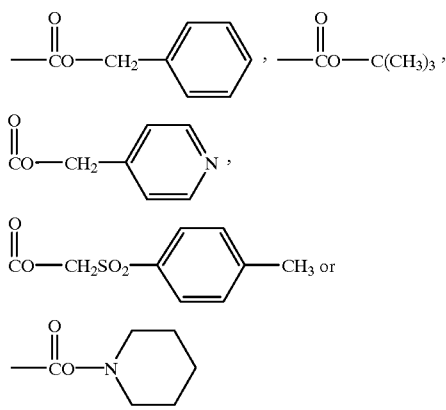

wherein X, Y, $R_1$, $R_2$, m and n are as defined above, or $R_3$ and $R_4$, together with the linking nitrogen atom, form a pyrrolidinyl, piperidinyl or morpholinyl radical.

9. A compound of formula $$A''(B'')_x, \quad (XXIV)$$

wherein x is 2,

A" is the radical of a chromophore of the azo series, which radical contains x N atoms to which B" groups are attached, and B" is a group of formula

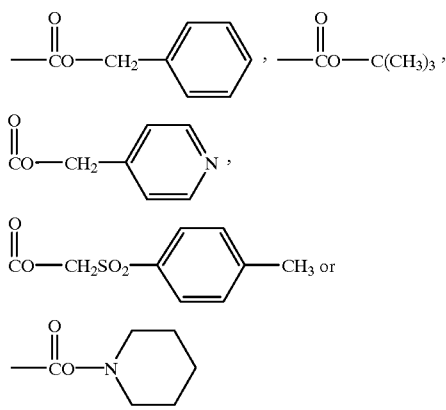

or B" is hydrogen, with the proviso that at least one B" is not hydrogen.

10. An azobenzimidazolone of formula (XIV):

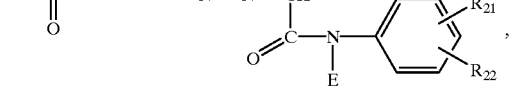

(XIV)

wherein $R_{21}$ and $R_{22}$ are each independently of the other hydrogen, halogen, $C_1$–$C_4$alkyl or $C_1$–$C_4$alkoxy, and E is each independently hydrogen or a group of formula

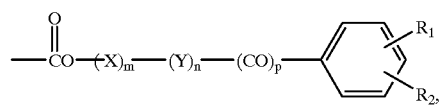   (II)

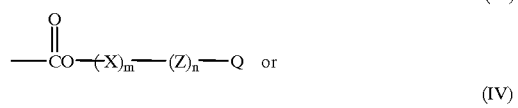   (III)

   (IV)

with the proviso that at least one E is of formula (II), (III) or (IV);

m, n and p are each independently of one another zero or 1,

X is $C_1$–$C_{14}$alkylene or $C_2$–$C_8$alkenylene,

Y is a group —V—$(CH_2)_q$—,

Z is a group —V—$(CH_2)_r$—,

V is $C_3$–$C_6$cycloalkylene, q is an integer from 1 to 6, and r is an integer from zero to 6, $R_1$ and $R_2$ are each independently of the other hydrogen, $C_1$–$C_6$alkyl, $C_1$–$C_4$alkoxy, halogen, CN, $NO_2$, unsubstituted phenyl or phenoxy or phenyl or phenoxy which are substituted by $C_1$–$C_4$alkyl, $C_1$–$C_4$alkoxy or halogen, Q is hydrogen, CN, $Si(R_1)_3$;

a group $C(R_5)(R_6)(R_7)$, wherein $R_5$, $R_6$ and $R_7$ are each independently of one another hydrogen or halogen and at least one of $R_5$, $R_6$ and $R_7$ is halogen;

a group

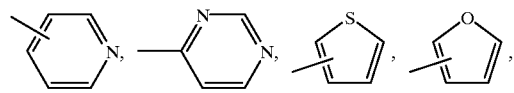

wherein $R_1$ and $R_2$ are as defined above;

a group $SO_2R_8$ or $SR_8$, wherein $R_8$ is $C_1$–$C_4$alkyl;

a group $CH(R_9)_2$, wherein $R_9$ is unsubstituted phenyl or phenyl which is substituted by $C_1$–$C_4$alkyl, $C_1$–$C_4$alkoxy or halogen; or a group of formula

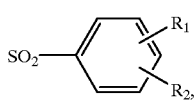

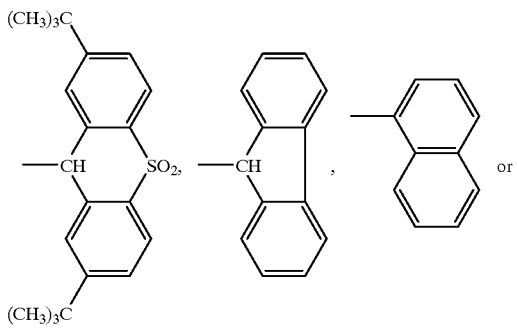

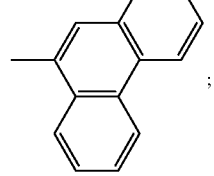

$R_3$ and $R_4$ are each independently of the other hydrogen, $C_1$–$C_{18}$alkyl, or a group

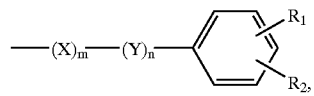

wherein X, Y, $R_1$, $R_2$, m and n are as defined above, or $R_3$ and $R_4$, together with the linking nitrogen atom, form a pyrrolidinyl, piperidinyl or morpholinyl radical.

* * * * *

UNITED STATES PATENT AND TRADEMARK OFFICE
CERTIFICATE OF CORRECTION

PATENT NO. : 6,013,776
DATED : January 11, 2000
INVENTOR(S) : Zhimin Hao et al

It is certified that error appears in the above-identified patent and that said Letters Patent is hereby corrected as shown below:

On the title page, Section [62] should read:

-- Related U.S. application Data

[62] Division of application No. 08/677,287, Jul. 9, 1996, Pat. No.5,780,627, which is a division of application No. 08/319,399, Oct. 6, 1994, Pat. No. 5,561,232. --.

Signed and Sealed this

Seventh Day of November, 2000

*Attest:*

Q. TODD DICKINSON

*Attesting Officer*     *Director of Patents and Trademarks*